Patented Nov. 30, 1948

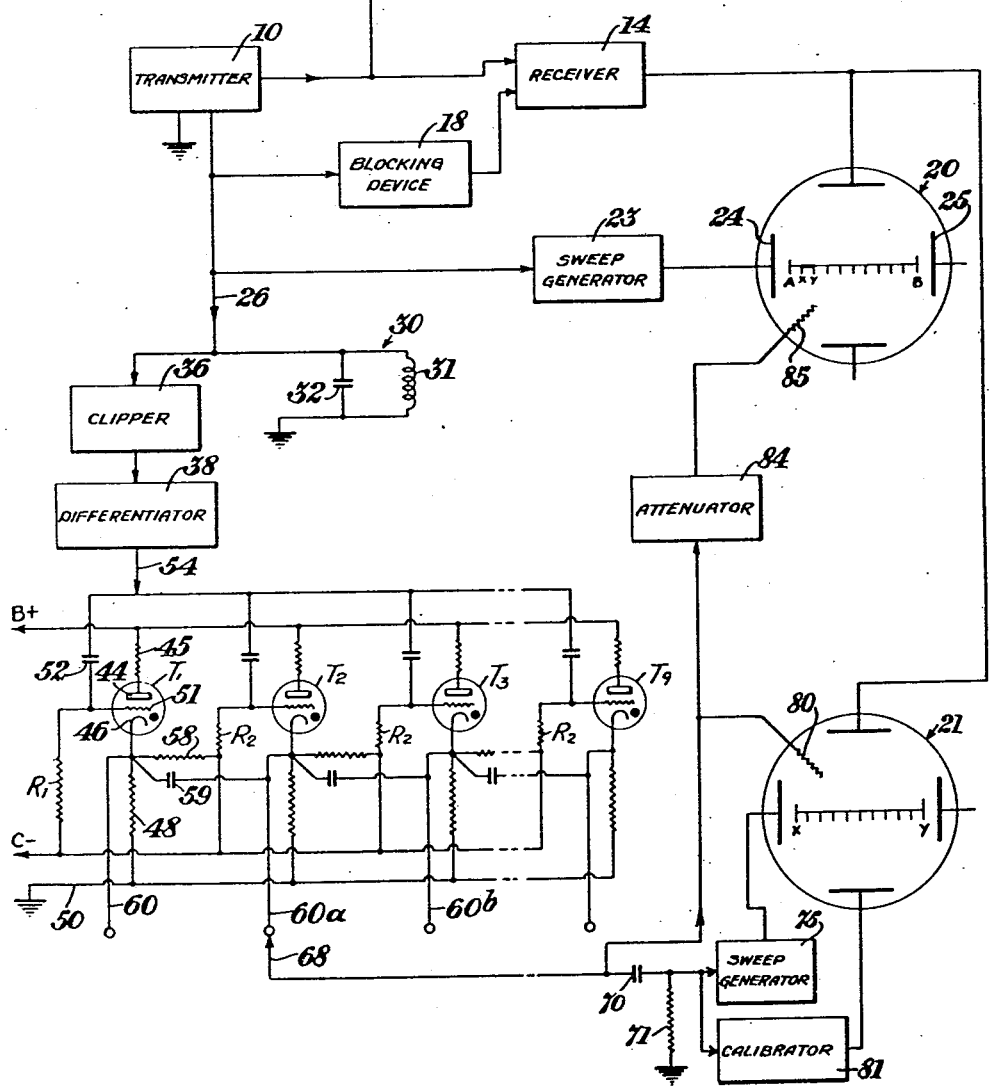

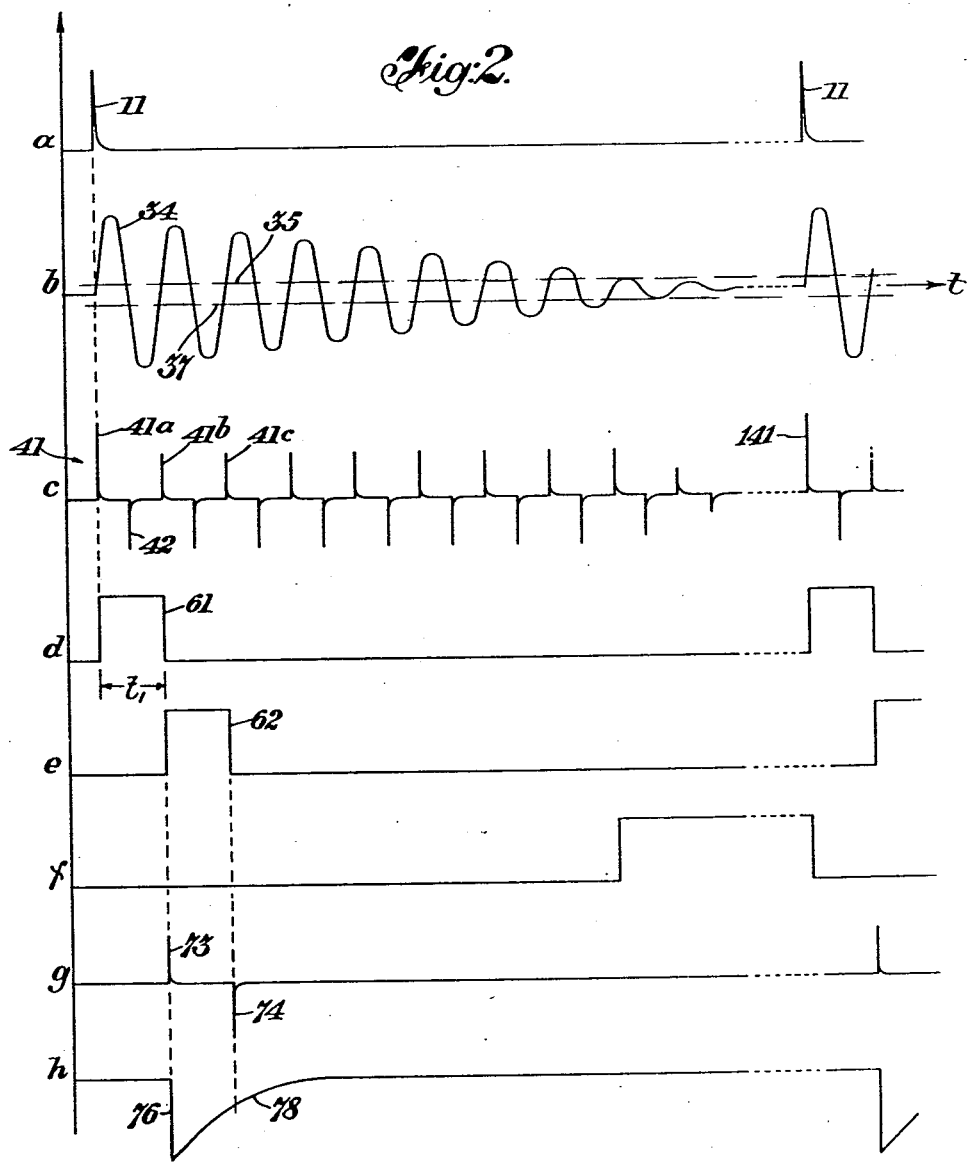

2,454,782

UNITED STATES PATENT OFFICE 2,454,782

ADJUSTABLE EXPANDED SWEEP FOR RADAR OSCILLOSCOPES

Louis A. de Rosa, Staten Island, N. Y., assignor to Federal Telephone and Radio Corporation, Newark, N. J., a corporation of Delaware Application December 8, 1942, Serial No. 468,198

6 Claims. (Cl. 343—13)

1

This invention relates to radio detection systems such as used for detection of hostile aircraft and ships and more particularly to a system for producing pulses that may be used as a reference indicator for a first oscillograph and for synchronizing and determining the duration of the perceptible sweep of a second oscillograph.

In my copending application Serial No. 464,008, filed October 31, 1942, I disclose radio detection systems having first and second oscillographs the first oscillograph to provide a panoramic view of a total effective range such as 200 miles or more and the second oscillograph to provide a magnified view of a small portion such as 10 to 20 per cent of the total range of the first oscillograph. The first or panoramic oscillograph provides for an approximate measure of the distance to obstacles the echoes of which appear on the screen thereof while the second or vernier oscillograph provides for vernier measurements of such distances. In order to indicate on the sweep of the panoramic oscillograph that portion of the range covered by the sweep of the vernier oscillograph, I provide several different systems as disclosed in my aforesaid copending application for producing a reference indicator of a duration corresponding to the visible sweep of the vernier oscillograph and apply it to the panoramic oscillograph.

It is an object of my present invention to provide another system for producing the reference indicator above referred to and for controlling therewith the perceptible sweep of the vernier oscillograph.

Another object of this invention is to provide in a radio detection system means to selectively displace in respect to time, the occurrence of the reference indicator for the panoramic oscillograph and the initiation of the sweep cycle of the vernier oscillograph with respect to the occurrence of an impulse transmitted for detection purposes.

The above objects and others ancillary thereto will become more apparent upon consideration of the following detailed description to be read in connection with the accompanying drawings, in which:

Fig. 1 is a schematic illustration of a radio detection system in accordance with this invention, and Fig. 2 is a graphical illustration showing the manner in which the reference indicator pulse is produced and varied selectively in time with respect to the transmission of impulses.

Referring to Figs. 1 and 2, the radio detection system therein shown includes a transmitter 10 and an antenna 12 for transmission of recurring impulses 11, curve $a$, Fig. 2. The transmission of impulses may be recurrent at a given frequency or the recurrence may be unsteady. A receiver 14 together with cathode ray oscillographs 20 and 21 are provided to receive and indicate echo pulses caused by obstacles in response to the transmitted impulses 11. Connecting the transmitter to the receiver is the usual blocking device 18 arranged to block the receiver during the transmission of impulses. The oscillograph 20 is in the nature of a panoramic oscillograph for indication of echo pulses throughout a given range. The oscillograph 21 is arranged to cover a selected small portion of the sweep of the panoramic oscillograph 20 for vernier determination of the distance to a particular echo pulse. The sweep for the panoramic oscillograph 20 is controlled by the transmission of impulses 11, energy of pulses being applied to a sweep generator 23 which is connected across the deflection plates 24 and 25 of the oscillograph 20.

The reference indicator pulse by which I indicate a portion $x$—$y$ of the sweep A—B of the oscillograph 20 which corresponds to the full sweep of the vernier oscillograph 21 is produced by the following system. Energy of the impulses 11 is applied over a connection 26 to a shock excitable resonant circuit 30 comprising an induction coil 31 and a condenser 32. The excitation of the circuit 30 produces a damped wave 34 such as indicated in curve $b$. The wave thus produced is applied to a clipper 36 which limits the wave between the levels 35 and 37 thereby producing a wave of rectangular form. The rectangular wave is differentiated by a differentiator 38 thereby producing a series of alternately positive and negative pulses 41 and 42, curve $c$.

The initial positive pulse 41$a$, however, is of greater amplitude than the others because the energy of the pulse 11 is applied along with the initial portion of the wave 34. This imposes on the clipper and differentiator a greater lump of energy at that instant thereby producing an initial pulse of greater amplitude.

This series of pulses is applied to a group of gas discharge devices, such as disclosed in my copending divisional application, Ser. No. 556,715, filed Oct. 2, 1944, arranged in parallel connection to provide a plurality of separate paths for conduction of energy, the conduction of the different devices being restricted in a time relation corresponding to the occurrence of the pulses applied thereto. More particularly, the gas discharge devices comprise a plurality of gas discharge tubes $T_1$ through $T_9$, preferably of the character known by trade-mark "Thyratron." While I have indicated nine such tubes, it will be understood, of course, that a lesser or greater number of gas discharge tubes may be used.

The tube $T_1$ which is the initial tube of the series is provided with an anode 44 to which is applied an anode potential B+ through a resistance 45. The cathode 46 of the tube $T_1$ is connected through a resistor 48 to a ground connection 50 and the grid 51 thereof is connected through a coupling condenser 52 to the output 54 of the differentiator 38. Connected also to the grid 51 through a resistor $R_1$ is a source of negative bias C—. The tubes $T_2$ through $T_9$ are similarly connected to the sources of bias B+ and C—, to the ground connection 50 and to the output connection 54. The resistors $R_2$ for the tubes $T_2$ through $T_9$ are selected of a value less than the value of the resistor $R_1$. The purpose for this selection is that the tube $T_1$ is thereby provided with a bias less negative than the bias of the other tubes so that it will respond to the initial pulse 41a while the other tubes $T_2$ through $T_9$ will not respond to the pulse 41a.

From the foregoing description it will be clear that when a series of pulses such as the series 41 is applied to the tubes $T_1$ through $T_9$ the first tube $T_1$ will fire thereby producing a conductive path through the tube between the anode 44 and the cathode 46. This conduction is made use of to prime the next succeeding tube $T_2$ of the series so that the tube $T_2$ will fire at the occurrence of the next succeeding pulse. This is accomplished by providing a resistor 58 between the cathode 46 and the resistor $R_2$. The firing of tube $T_1$ provides a positive potential at the cathode 46 and this in turn renders through resistor 58 the potential on the grid of tube $T_2$ less negative. Thus when the second pulse 41b is applied to the tubes the tube $T_2$ will fire thereby producing a conductive path similarly as in the case of $T_1$.

I utilize the conduction of the tube $T_2$ to extinguish the conduction of the tube $T_1$. I accomplish this by providing a condenser connection 59 between the cathode of the tube $T_2$ and the cathode 46 of the tube $T_1$. When conduction occurs in the tube $T_2$ the potential drop of the tube $T_2$ causes the potential on the cathode 46 to approach the potential of the anode 44 thereby extinguishing the tube $T_1$.

The energy flow through the tube $T_1$ is tapped off through a connection 60. The pulse produced by the energy that may be tapped off the connection 60 is rectangular in shape as indicated at 61, curve d, the leading edge thereof being in time relation with the impulse 11 and the pulse 41a while the trailing edge thereof is in time relation with the pulse 41b. The energy that may be tapped off of the cathode connection 60a of the tube $T_2$ is likewise of rectangular shape as indicated at 62, curve e. The leading edge of this rectangular pulse is in time relation with the pulse 41b while the trailing edge thereof is in time relation with the pulse 41c the latter pulse being the next in series to operate the tube $T_3$ which in turn operates to extinguish tube $T_2$.

This timing operation of the tubes continues until the end tube $T_9$ is fired. The firing condition of the tube $T_9$, however, may continue as indicated in curve f until a new series of pulses 41 is produced by the circuit 30. Such a new series is indicated at 141. The end tube $T_9$ is extinguished when the first tube $T_1$ fires in response to the initial pulse of the series 141. This extinction of the tube $T_9$ is produced by the condenser connection 59 which exists between the cathodes of the several tubes.

Should the series of pulses 41 be greater than the number of tubes, the tubes will not start a new firing cycle until a new series of pulses is applied thereto. This is because the resistor $R_1$ is so selected as to bias the tube $T_1$ sufficiently to require for it to fire, a pulse greater in amplitude than 41b, 41c etc. As hereinbefore pointed out the initial pulse of each series is always of greater amplitude than the other pulses of the series and the bias through $R_1$ is such that the initial pulse fires the tube $T_1$ thereby initiating the counting operation of the tubes.

The oscillations of the wave 34 may have a selected period depending upon the tuning of the circuit 30. For example, the period of the wave may cover 10 to 40 microseconds more or less as may be desired. This will provide pulses 61, 62 etc. which are of a selected duration and this duration I use to determine the sweep interval for the vernier oscillograph 21. Should the output connection 60a of the tube $T_2$ be connected to control the sweep of the oscillograph 21, the pulse 62, for example, would then be the controlling pulse. The energy of the pulse 62 as indicated in curve g, Fig. 2, is differentiated by a differentiating circuit comprising a condenser 70 and a resistor 71 thereby producing a positive pulse 73 corresponding to the leading edge of the pulse 62 and negative pulse 74 corresponding to the trailing edge thereof. The positive pulse 73 is used to synchronize the sweep generator 75 which may be of a form of saw-tooth generator which operates on the controlled charging and discharging of a condenser. The pulse 73, for example, operates as the condenser discharging pulse for the sweep generator thereby producing a potential drop indicated at 76, curve h. This permits the condenser of the generator to recharge as indicated by the curve 78. In order to determine the intensity of the beam of the oscillograph 21 and therefore use for the perceptible portion of the sweep the linear portion of the curve 78, the pulse 62 is applied to an intensity control element 80 such as the grid of the oscillograph 21, whereupon the sweep x—y is made perceptible for an interval corresponding to the duration of the pulse 62.

The portion of the sweep A—B of the oscillograph 20 covered by the sweep x—y is indicated by applying energy of the pulse 62 through an attenuator 84 to a beam intensity control element 85 whereupon the portion of the sweep A—B which corresponds to the sweep interval x—y is indicated by an added brilliance.

The time selection of the occurrence of the pulse controlling the sweep x—y is determined by the adjustment of the movable contact 68 which may be adjusted to engage any one of the outlet connections of the tubes $T_1$ through $T_9$. As shown, the contact is in engagement with the outlet connection 60a indicating that the sweep x—y commences at a time interval $t_1$ with respect to the occurrence of the impulse 11. Should the contact 68 be moved to the outlet connection 60b of the tube $T_3$, the timing of the sweep x—y with respect to the occurrence of the pulse 11 would be twice the time interval $t_1$. Thus, by changing the position of the contact 68 any desired portion of the sweep A—B may be reproduced in magnified proportion on the oscillograph 21.

Should it be desirable to provide a negative output pulse from the tubes $T_1$ through $T_9$ such outlet connections may be made at the anodes of the tubes.

The screen of the vernier oscillograph 21 may be calibrated by any suitable calibrator 81, and may, for example, comprise a calibration system such as disclosed in my copending application entitled "Timing system," Serial No. 466,557, filed November 23, 1942, now Patent No. 2,438,904, issued April 6, 1948.

While I have shown and described herein the principles of my invention in connection with a specific apparatus, I recognize that many modifications and variations thereof are possible without departing from the invention. For example, apparatus other than the series of gas-filled tubes may be provided to count the pulses 41. That is to say, a circuit having vacuum tubes may be substituted in the place of the circuit having the gas-filled tubes, it being understood, of course, that such vacuum tube circuit would include circuit connections having biasing controls and time constants different from those of the present circit. It will therefore be understood that the apparatus herein shown and described is to be regarded as illustrative of the invention only and not as a limitation on the scope thereof as set forth in the objects and the appended claims.

I claim:

1. In a radio detection system having means to transmit impulses and receiver means including first and second oscillographs each with a sweep producing means to receive and indicate echo pulses caused by obstacles in response to transmitted impulses; the combination therewith of reference indicator control means comprising means to generate a series of pulses in response to impulse transmission, means providing a plurality of conductive paths, means to restrict conduction of said paths in a time relation corresponding to the occurrence of said pulses, means to selectively obtain energy from said conductive paths thereby producing a reference pulse of given duration selectively displaced with respect to the occurrence of said impulse transmission, means to apply said reference pulse to said first oscillograph to produce thereon a reference indicator designating a time interval corresponding to said given duration, and means responsive to energy of said reference pulse to synchronize the sweep of said second oscillograph with the part of the sweep of said first oscillograph designated by said reference indicator.

2. The system defined in claim 1 wherein the means for synchronizing the sweep of said second oscillograph includes means to differentiate the pulse of given duration to provide a sharp pulse corresponding to the leading edge thereof and means using said sharp pulse to synchronize said sweep.

3. The system defined in claim 1 wherein the means for synchronizing the sweep of the second oscillograph includes means responsive to the energy of the pulse of given duration to control the brilliance of the sweep line of the second oscillograph.

4. In a radio detection system having means to transmit an impulse and receiver means including an oscillograph to receive and indicate echo pulses caused by obstacles in response to the transmitted impulse; the combination therewith of means to generate a series of pulses initiated in synchronism with the transmission of said impulse, means providing a plurality of conductive paths, means to restrict conduction of said paths in a time relation corresponding to the occurrence of said pulses, means to selectively obtain current from said conductive paths thereby obtaining a pulse of current displaced in time with respect to said impulse according to the time relation therewith of one of the pulses of said series, and means responsive to the pulse of current for controlling the initiation of a sweep potential for said oscillograph, whereby initiation of the sweep for said oscillograph may be selectively delayed with respect to the transmission of said impulse.

5. The system defined in claim 4 wherein the pulse of current is of a given duration, in combination with means responsive to said pulse of current to control the brilliance of the sweep line of the oscillograph.

6. The system defined in claim 4 wherein the means to generate a series of pulses includes a resonant circuit shock excitable in response to energy of said impulse to produce a wave from which pulses of a given time displacement can be produced.

LOUIS A. DE ROSA.

REFERENCES CITED

The following references are of record in the file of this patent:

UNITED STATES PATENTS

| Number | Name | Date |
| --- | --- | --- |
| 1,932,589 | Holden | Oct. 31, 1933 |
| 1,933,219 | Nakajima et al. | Oct. 31, 1933 |
| 2,146,862 | Shumard | Feb. 14, 1939 |
| 2,189,549 | Hershberger | Feb. 6, 1940 |
| 2,227,598 | Lyman et al. | Jan. 7, 1941 |
| 2,294,863 | Hadfield | Sept. 1, 1942 |
| 2,306,386 | Hollywood | Dec. 26, 1942 |
| 2,313,906 | Wendt | Mar. 16, 1943 |
| 2,355,363 | Christaldi | Aug. 8, 1944 |
| 2,368,448 | Cook | Jan. 30, 1945 |